United States Patent [19]

Yamamura et al.

[11] 4,123,664
[45] Oct. 31, 1978

[54] OZONE GENERATING APPARATUS

[75] Inventors: Takashi Yamamura; Norikazu Tabata; Yoshihiko Yamamoto, all of Amagasaki, Japan

[73] Assignee: Mitsubishi Denki Kabushiki Kaisha, Tokyo, Japan

[21] Appl. No.: 789,437

[22] Filed: Apr. 20, 1977

Related U.S. Application Data

[63] Continuation of Ser. No. 577,456, May 14, 1975, abandoned.

[30] Foreign Application Priority Data

Jun. 12, 1974 [JP] Japan .................................. 49-65484

[51] Int. Cl.² ............................................. C01B 13/11
[52] U.S. Cl. ..................................... 250/536; 250/535
[58] Field of Search ................................ 250/532–541; 204/176; 321/4, 45 R

[56] References Cited

U.S. PATENT DOCUMENTS

| | | | |
|---|---|---|---|
| 3,303,407 | 2/1967 | Depenbrock et al. | 321/45 R |
| 3,800,210 | 3/1974 | Caussin | 250/535 |
| 3,887,862 | 6/1975 | Hubner | 321/45 C |

Primary Examiner—Benjamin R. Padgett
Assistant Examiner—Deborah L. Kyle
Attorney, Agent, or Firm—Oblon, Fisher, Spivak, McClelland & Maier

[57] ABSTRACT

An ozone generating apparatus comprises a rectangular waveform current feeding device for feeding rectangular waveform alternating current between discharge electrodes of a discharge tube of an ozone generator so that a constant current is fed by the rectangular waveform current feeding device during a half cycle period to the ozone generator which is equivalent to a capacitor. Accordingly, the voltage applied to the ozone generator has a waveform which changes in proportion to the time period. Such a voltage waveform is ideal for the ozone generator to improve the conventional ozone generating apparatus.

6 Claims, 11 Drawing Figures

F I G. 5
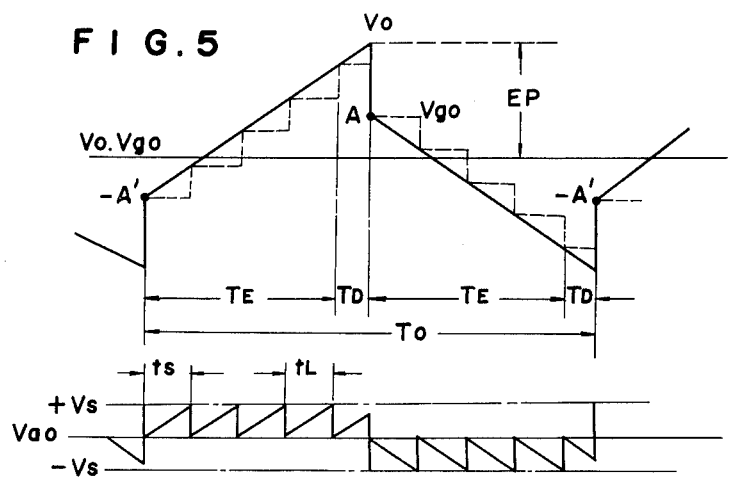
F I G. 6
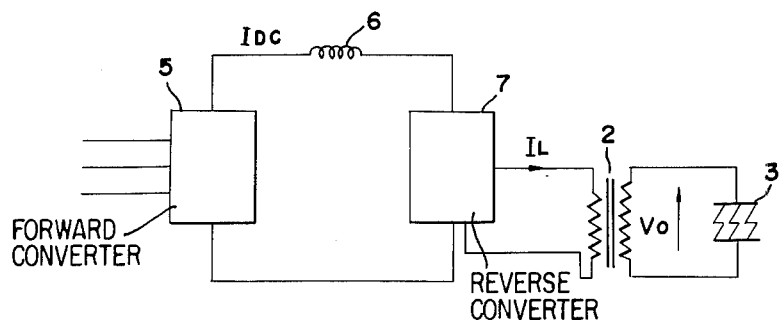

OZONE GENERATING APPARATUS

This is a continuation of application Ser. No. 577,456, filed May 14, 1975 now abandoned.

BACKGROUND OF THE INVENTION

1. Field of the Invention

The present invention relates to an improved ozone generating apparatus.

2. Description of the Prior Art

It has been known that ozone can be generated by a discharge and can be used in various fields as an oxidizing agent or a bactericide. Recently, the applications of ozone have increased, especially in the field of elimination of pollution, ozone being used for treatment of sewage, industrial drainage and nitrogen oxides $NO_x$ in effluent gas.

FIG. 1(a) is a schematic view of a conventional ozone generating apparatus wherein a glass discharge tube 13 is disposed in the center of a metallic cylinder 12 and a metallic electrode 14 is adhered or vapormetallized on an inner surface of the glass discharge tube 13 and is connected to a high voltage terminal 15.

A power source 1 is connected to a high voltage terminal 15 and the metallic cylinder 12 on its outer surface so as to apply a sinusoidal waveform voltage having commercial or high frequency. Oxygen in the air fed from one end of the metallic cylinder 12 is converted to ozone by the discharge in the gap between the metallic cylinder 12 and the glass discharge tube 13.

FIG. 2 is a circuit diagram of the power source system of the conventional ozone generating apparatus.

FIGS. 3(a), 3(b) are schematic operating waveforms of power voltage V and current i of the ozone generator.

In FIG. 2, the reference 1 designates the power source for driving the ozone generator (such as a power source having commercial frequency); 2 designates a boosting transformer; 3 designates an ozone generator and 4 designates a reactor for power-factor improvement. When the power voltage is the sinusoidal waveform voltage $V_{(t)}$ of FIG. 3(a), the ozone generator 3 is an equivalent capacitor whereby the phase gains $\pi/2$ (rad) from the power voltage as shown in FIG. 3(b). Accordingly, the current waveform is significantly changed during the discharge period $T_E$ and the current $i_{(t)}$ as a part of the sinusoidal waveform is fed during the non-discharge period $T_D$.

The ozone generator can be considered equivalent to the series circuit of a capacitor $C_g$ formed by the glass discharge tube 13 and a capacitor $C_a$ formed by a gap between the metallic cylinder 12 and the glass discharge tube 13 as shown in FIG. 1(b). In FIG. 1(b), when the discharge occurs in the gap, the capacitor $C_a$ is considered as a short-circuit and only capacitor $C_g$ remains in the equivalent circuit. This is schematically shown as turning on the switch S.

The operation of the conventional ozone generator will now be illustrated. The ozone generator is considered as a series circuit of the capacitors $C_g$ and $C_a$ wherein $C_a << C_g$, in general. As shown in FIG. 1(b), the voltage applied to the ozone generator is shown as V and the partial voltage for the capacitor $C_g$ is shown as $V_g$ and the partial voltage for the capacitor $C_a$ is shown as $V_a$. When the sinusoidal waveform voltage V is applied to the ozone generator, and as shown in FIG. 4, the terminal voltage $V_a$ of the capacitor $C_a$ reaches the positive discharge voltage $V_s$ at the time $t_1$ and the discharge in the gap occurs to provide O(V) of $V_a$. Prior to the discharge, the terminal voltage $V_g$ of the capacitor $C_g$ which is formed by the glass discharge tube is not substanitally changed under the relation of $C_a << C_g$ as shown by the dotted line.

However, when the discharge occurs as the short-circuit of $C_a$ at the time $t_1$, all of the power voltage V is applied to $C_g$ to provide $V(t_1) = V_g(t_1)$ at the time $t_1$ and $V_g$ rises to $V(t_1)$ at the time $t_1$ as shown by the dotted line. The discharge is finished in a moment and the voltage is again applied to $C_a$.

The change of the voltage V of the ozone generator appears substantially as the change of the terminal voltage $V_a$ of $C_a$ under the relation of $C_a << C_g$ and $V_g$ is not substantially changed. Accordingly, the change of $V_a$ is substantially the same as that of V and the discharge occurs at the time $t_2$ in $V_a = V_s$. At the time $t_2$, the voltage $V_g$ becomes $V(t_2) = V_g(t_2)$ whereby $V_g$ rises as shown by the dotted line. The phenomenon is repeated until the time $t_5$.

After the time $t_5$, $V_a$ changes substantially the same as V. However, $V_a \geq V_s$ is not realized until the maximum value of V is reached and $V_a$ falls similar to the change of V until the time $t_6$. During this period, $V_a$ is changed from positive through zero to negative. At the time $t_6$, $V_a = -V_s$ is equal to the negative discharge voltage. At the time $t_6$, the discharge in the negative side occurs to give $V_a = 0$.

At the time $t_5$, $V_g$ becomes $V_g = V(t_5)$ and then $V_a$ is kept at a substantially constant value. However, at the time $t_6$, when the discharge occurs for $C_a$ to give $V_a = 0$ $V_g$ suddenly falls as shown by the dotted line because $V(t_6) = V_g$. After the time $t_6$, the same condition is repeated to give $V_a = -V_s$ at the times $t_7$, $t_8$, $t_9$ and $t_{10}$ and the discharges for $C_a$ occur at these times to change $V_g$ as shown by the dotted line.

Accordingly, when the ozone generator is used by applying a sinusoidal waveform voltage, the following conditions are realized.

(1) In one cycle period of the voltage $T_o$, the discharge phenomenon maintaining period is $2T_E$ from $t_1$ to $t_5$ and from $t_6$ to $t_{10}$ as shown in FIG. 4 and the discharge ceasing period is $2T_D$ from $t_5$ to $t_6$ and from $t_{10}$ to $t_{11}$. Thus, only about 50% of one cycle period is the discharge phenomenon maintaining period.

(2) The voltage $V_a$ is changed under substantially the same condition as that of V because of a constant of $\pm V_s$ of the discharge voltage in the gap and the fact that $C_g >> C_a$. Accordingly, the discharge interval is short around the zero point of the voltage V wherein $dv/dt$ is high and the discharge interval increases and is longest around the maximum value of the voltage V wherein $dv/dt$ is low.

Thus, $t_s < t_L$ as shown in FIG. 4. However, in the conventional ozone generating apparatus, the power $P_o$ is fed during the short period of $2T_E$ which is realized by subtracting $2T_D$ from $T_o$ whereby heat is generated during the short period in a concentrated condition.

Accordingly, the yield of ozone is decreased because of the rising temperature of the molecules in the gap and the discharge tube may be damaged because of the thermal and the mechanical stress of the glass discharge tube for the ozone generator.

In the case of operation by applying the conventional sinusoidal waveform voltage, $dv/dt$ of $V_t$ is changed during the operation and the discharge voltage $V_s$ in the gap remains constant. Accordingly, the frequency for repeating the discharges in the initial discharge period near the time $t_1$ and $t_6$ is high and the frequency gradually decreases. The power is concentrated near the zero point of the power voltage thereby decreasing the yield of ozone and increasing the thermal and mechanical stress for the glass discharge tube as above-mentioned.

SUMMARY OF THE INVENTION

It is therefore an object of the present invention to provide a novel ozone generating apparatus which overcomes the above-mentioned disadvantages of conventional ozone generating apparatus by feeding rectangular waveform alternating current between discharge electrodes to apply an ideal waveform voltage to the ozone generator.

It is another object of the invention to provide an improved power source for driving an ozone generator for generating ozone by utilizing the discharge phenomenon.

The foregoing and other objects are attained in accordance with one aspect of the present invention through the provision of ozone generating apparatus comprising an ozone generator including a discharge tube for generating ozone by discharge and a rectangular waveform current feeding device for feeding a rectangular waveform alternating current between the discharge electrodes of the discharge tube. The rectangular waveform current feeding device comprises a forward converter for converting a commercial frequency AC power source to a DC power source and a DC reactor and a reverse converter for converting from direct current to alternating current. A constant current is fed by the rectangular waveform current feeding device to the ozone generator which is considered to be an equivalent capacitor during a half cycle period whereby the voltage applied to the ozone generator has a voltage waveform which changes in proportion to the period which is an ideal voltage waveform for an ozone generator. Accordingly, the disadvantages of the conventional ozone generating apparatus are overcome.

BRIEF DESCRIPTION OF THE DRAWINGS

Various objects, features, and attendant advantages of the present invention will be more fully appreciated as the same becomes better understood from the following detailed description of the present invention when considered in connection with the accompanying drawings, in which:

FIG. 5 shows ideal waveforms for the operation of an ozone generator;

FIG. 6 is a schematic view of one embodiment of an ozone generating apparatus in accordance with the invention;

DETAILED DESCRIPTION OF THE PREFERRED EMBODIMENTS

Figure 1A:
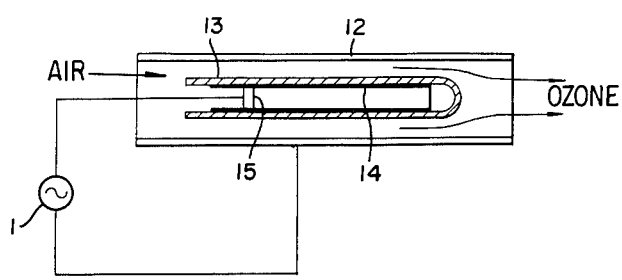
FIGS. 1(a) and 1(b) show a schematic view and an equivalent circuit of a conventional ozone generator.
Figure 1B:
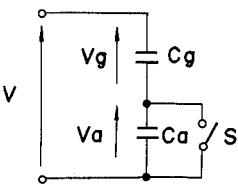
Figure 2:
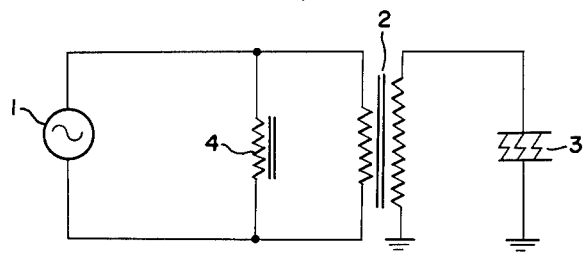
FIG. 2 is a circuit diagram of the conventional ozone generating apparatus.
Figure 3:
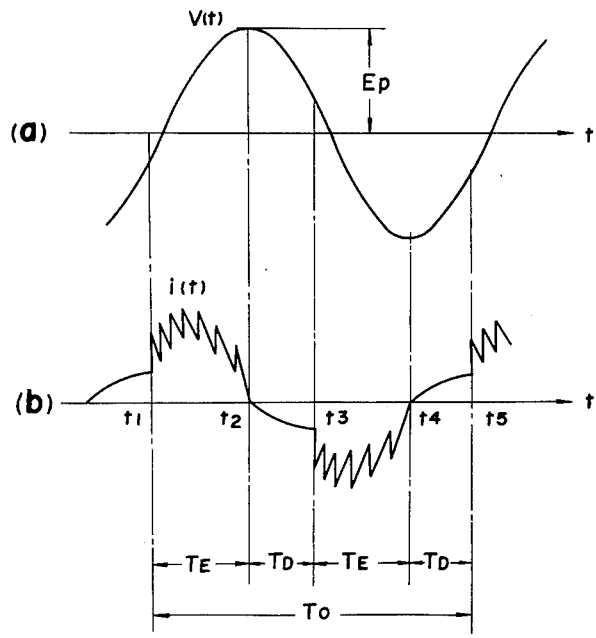
FIG. 3 shows waveforms for illustrating the operation of the apparatus of FIG. 2.
Figure 4:
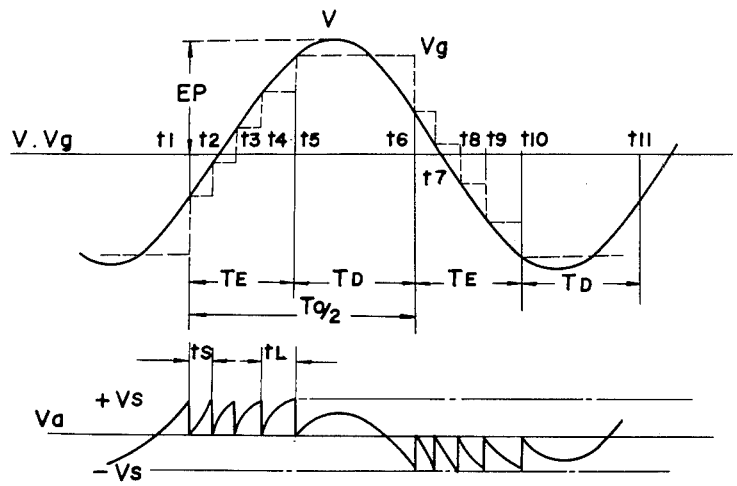
FIG. 4 shows waveforms for illustrating a discharge in the case of a sinusoidal waveform.

Referring now to the drawings, wherein like reference numerals designate identical or corresponding parts throughout the several views, and more particularly, to FIG. 5 thereof, the present invention is to drive an ozone generator by the ideal voltage waveform as shown in FIG. 5. In FIG. 5, the voltage $V_o(t)$ rises in the positive side in a constant gradient and suddenly falls when the voltage reaches the maximum value $E_p$. Then it rises in the negative side in a constant gradient.

When the voltage $V_o(t)$ is applied, the voltages applied to $C_g$ and $C_a$ change to $V_{go}$ and $V_{ao}$ as shown in FIG. 5 and the discharge results during almost all of one cycle period $T_o$. Moreover, the interval from the discharge to the next discharge for $C_a$ is usually the same as $tS = tL$ and the power is uniformly applied during the cycle period because of the constant of $dV_o/dt$.

FIG. 6 is a circuit diagram of one embodiment of the apparatus of the invention for providing the ideal voltage waveform. In FIG. 6, the reference 5 designates a forward converter for converting the commercial frequency AC power source to a DC power source; 6 designates a DC reactor which is also used for current smoothing and separating a DC circuit from an AC circuit and 7 designates a reverse converter for converting from direct current to alternating current. The combination of 5, 6 and 7 is usually referred to as a current type inverter.

The reference 2 designates a boosting transformer and 3 designates an ozone generator which can be a conventional one. In the ozone generating apparatus of the invention, the DC reactor 6 connected between the forward converter 5 and the reverse converter 7 has a significantly high inductance and the current $I_{DC}$ passing through the reactor 6 is the constant DC as shown in FIG. 7(a) regardless of the condition of the circuit of the reverse converter 7, the boosting transformer 2 and the ozone generator 3 which is the load, except for a shift of the ignition phase angle α of the forward converter which may be a thyristor.

The reverse converter 7 is a switch circuit for alternatively switching the polarity to feed the current to the boosting transformer 2 and the ozone generator. The output current of the reverse converter 7 is a substantially rectangular waveform alternating current which has an amplitude equal to $I_{DC}$ as shown in FIG. 7(b) as $I_L$.

The typical reverse converter for feeding the rectangular current to the load is a current type inverter. Accordingly, the voltage $V_o(t)$ applied to the ozone generator 3 is given by the equation $$V_o(t) = \frac{1}{C} \int_0^{T_E} I_{DC} dt = \frac{1}{C} I_{DCt} + V_o(O)$$

because the ozone generator 3 is an equivalent capacitor and a constant current is fed to the ozone generator during a half cycle period.

The voltage changes in proportion to the period to provide the voltage waveform shown in FIG. 7(c) which is similar to the ideal voltage waveform of FIG. 5 and best for the ozone generator.

The current inverter has a characteristic for controlling the load voltage and power by changing the current $I_{DC}$. In general, the current type inverter has a control commutating element such as a thyristor for switching the current.

In the switching operation, a commutating period which is a limited period $t_u$ (not shown) is required. The current $I_L$ changes from $+I_{DC}$ to $-I_{DC}$ or from $-I_{DC}$ to $+I_{DC}$ during the period. Accordingly, it does not have a perfect rectangular waveform.

However, in general, the period $t_u$ is quite short compared to the cycle period $T_o$ so that the waveform can be considered to be substantially a rectangular waveform. However, when the polarity of the current is changed, the voltage of the ozone generator decreases to stop the discharge to form the series circuit of $C_a$ and $C_g$. During the discharge period, the circuit comprises only $C_g$. However, during the non-discharge period, the gradient of voltage drop becomes high until the occurrence of the next discharge in opposite polarity because the capacitor $C_a$ having a small capacity is charged to opposite polarity by the same current since $C_a << C_g$.

It is quite important that the voltage $V_o$ be maintained without changing the polarity just after the commutating period $t_u$. After changing the direction of the current $I_L$, the voltage $V_o$ is changed from one polarity through zero to the opposite polarity. The period $t_r$ from the finish of commutation to the time $V_o = 0$ is usually the period for applying the reverse voltage which is required for switching a switch element such as the thyristor of the reverse converter 7 from the ON state to the OFF state.

When the period for applying the reverse voltage is shorter than the forward voltage block recovery period $t_{off}$ of (not shown) the switching element such as the thyristor, the switching element in the OFF state (under the blocking condition) is switched to the ON state at the moment the voltage $V_o$ is switched to the opposite polarity through the zero point whereby the DC power source forms a short-circuit to cause the commutation failure phenomenon and the operation of the apparatus is stopped. However, the forward voltage block recovery period $t_{off}$ of the switching element is usually in the range $10_{\mu s} - 100_{\mu s}$ and is significantly short compared to the cycle period $T_o$.

When a current type inverter is used as a power source for an ozone generator, the phase of the current approaches the phase of the voltage to cause $t_r > t_{off}$. In the current feed type inverter, the phase of the current usually approaches $\phi = \omega(t_r - t_u/2)$ from the phase of the voltage ($\omega = 2\pi f$).

Figure 7:
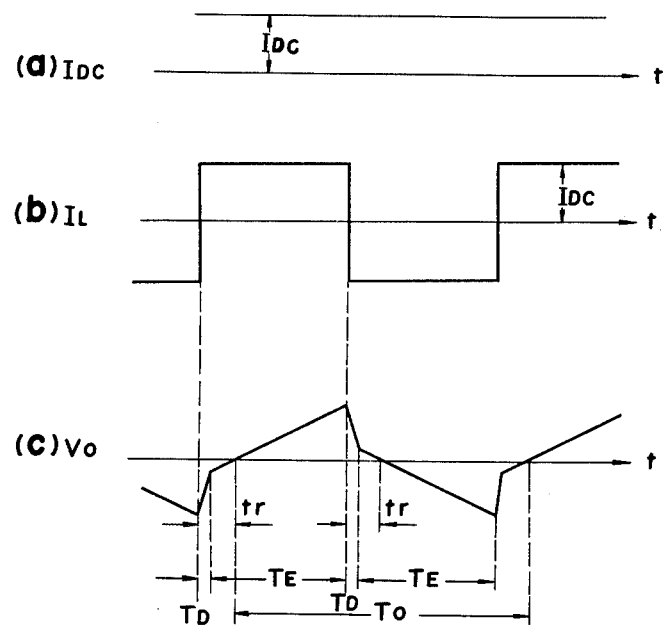
FIG. 7 shows waveforms for illustrating the operation of the apparatus of FIG. 6.

Accordingly, if the voltage waveform of FIG. 7 is a sinusoidal or a rectangular waveform having the same phase, the power factor P.F. $= \cos \phi$. However, in the case of the waveform $V_o$ of FIG. 7, the phase of the fundamental wave component of $V_o$ is slightly less to provide a power factor slightly lower than $\cos \phi$.

When the current feed type inverter is used, it is unnecessary to use a reactor for power factor compensation since it is operated at the phase angle for providing the reverse voltage period $t_r$ which is higher than the forward voltage block recovery period $t_{off}$ which is required for a switching element such as a thyristor used in the reverse converter 7.

Figure 8:
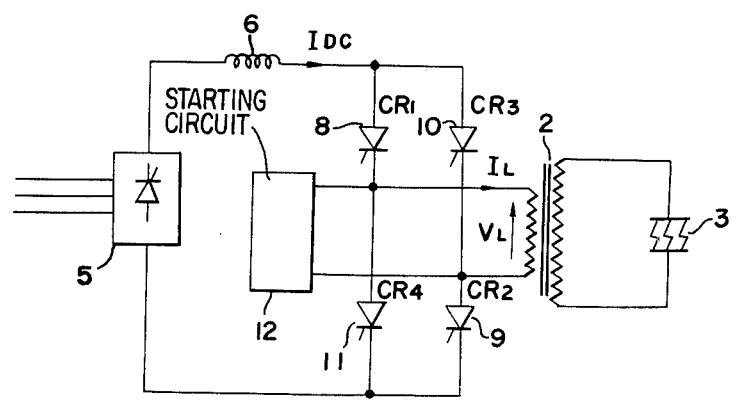
FIG. 8 is a circuit diagram of one embodiment of the apparatus of the invention using a thyristor inverter.
Figure 9:
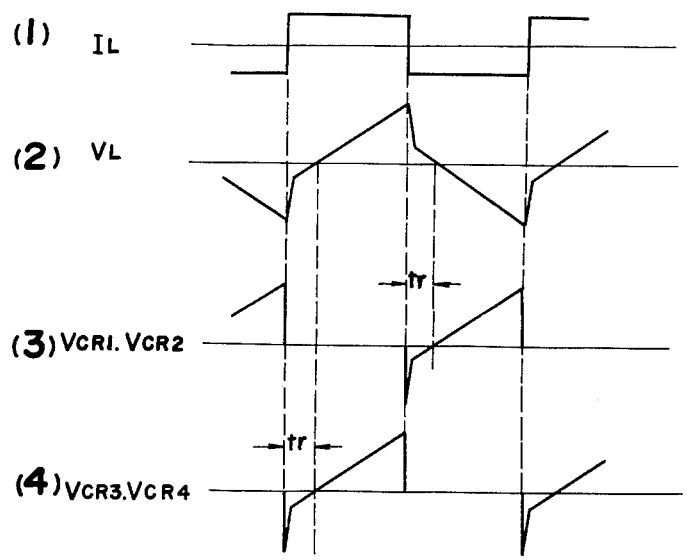
FIG. 9 shows waveforms for illustrating the operation of the apparatus of FIG. 8.

FIG. 8 is a circuit diagram of one embodiment of the ozone generating apparatus of the invention which utilizes the principle shown in FIG. 6. FIG. 9 shows waveforms for illustrating the operation.

In the embodiment of FIG. 8, the thyristor bridge 8 – 11 and the starting circuit 11 are used as the reverse converter 7 of FIG. 6. The load current $I_L$ and the voltage $V_L$ of the ozone generator shown in FIG. 9 (1), (2) have the same waveforms as those of FIG. 7.

In normal operation, the load current $I_L$ in the positive side is fed to the load when the thyristors 8, 9 are turned on. The current $I_L$ in the negative side is fed to the load when the thyristors 10, 11 are turned on whereby the voltage $V_L$ is applied as shown in FIG. 9(2).

When the thyristors 8, 9 are in the ON state and the thyristors 10, 11 are turned on, the voltage $V_L$ is applied as a reverse voltage to the thyristors 8, 9 whereby the thyristors 8, 9 are blocked. When the reverse voltage is applied for the period $t_r$, the thyristors 8, 9 are completely in the OFF state. When the thyristors 8, 9 are turned on, the voltage $V_L$ applied as a reverse voltage to the thyristors 10, 11 whereby the thyristors 10, 11 are blocked.

FIG. 9(3), (4) show the voltage waveforms of the thyristors 8 – 11 which show the phenomenon in detail. When the waveforms of FIG. 9(3), (4) are on the zero line, the thyristors are in the ON state. During other periods, the thyristors are in the OFF state.

In the ozone generating apparatus of FIG. 8, the direct current $I_{DC}$ is controlled by the load voltage controlling device and the frequency is repeatedly controlled by the frequency control circuit. Accordingly, the frequency controlling circuit has the fundamental control function for the current type inverter such as the control of the gate firing signal for the thyristors 8–11.

The starting circuit 12 is for feeding the energy for commutation of the thyristors 8-11 to the load of the ozone generator at the time the ozone generating apparatus is started. The single current is fed from the charged capacitor to the load.

Figure 10:
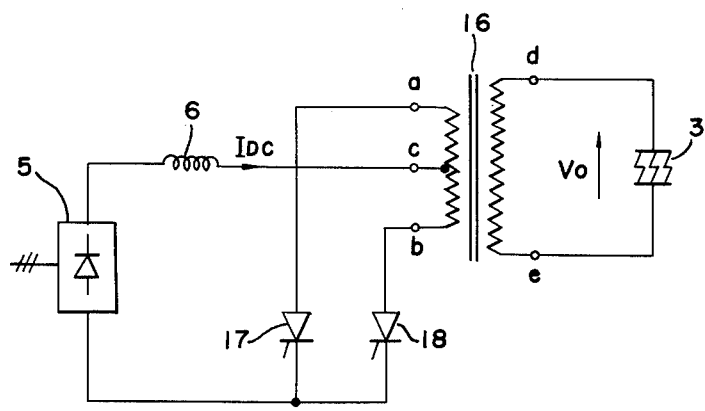
FIG. 10 is a circuit diagram of another embodiment of the invention.

FIG. 10 is a circuit diagram of another embodiment of the invention. In FIG. 10, the reference 16 designates a boosting transformer having a middle tap in a primary winding to feed the constant current $I_{DC}$ from the terminal c. When the thyristor 17 is turned on, the current $I_{DC}$ is fed from the terminal c of the transformer through the terminal a and the thyristor 17, and the voltage $V_o$ changes in proportion to the period of the negative maximum value $- E_p$. When the thyristor 18 is turned on at the time of $V_o = -E_p$, the reverse voltage of $-E_p(V)$ is applied to the thyristor 17 to block the thyristor.

In accordance with the invention, it is possible to apply a voltage having a waveform similar to the ideal voltage waveform of FIG. 5 to the ozone generator by feeding a rectangular waveform alternating current between the discharge electrodes of the ozone generator by the use of a rectangular waveform AC generating device such as a current type inverter.

Accordingly, uniform discharges occur in equal intervals during all periods and uniform power is fed to the ozone generator whereby the yield of ozone is increased and the thermal and mechanical stress of the discharge tube is remarkably improved.

As a result, the rated power of a discharge tube having the same size can be increased compared to the conventional ozone generating apparatus operated by a sinusoidal waveform voltage. The increase of the rated voltage makes possible miniaturization of the apparatus including the cooling system for the discharge tube and ozone generating apparatus of large capacity. Accordingly, significant practical advantages are attained.

Obviously, numerous modifications and variations of the present invention are possible in light of the above teachings. It is therefore to be understood that within the scope of the appended claims the invention may be practiced otherwise than as specifically described herein.

What is clamed as new and desired to be secured by Letters Patent of the United States is:

1. An ozone generating apparatus comprising:
   an ozone generator having a discharge tube with discharge electrodes, and
   a rectangular waveform current feeding device for feeding rectangular waveform current through the discharge electrodes of the discharge tube without a capacitive coupling circuit between the discharge electrodes and the rectangular waveform current feeding device for driving the ozone generator.

2. The ozone generating apparatus according to claim 1 wherein the rectangular waveform current feeding device is a current type inverter comprising
   a forward converter for obtaining direct current from an alternating current power source,
   a reverse converter for reversely converting the resulting direct current to alternating current and
   a DC reactor connected between the forward converter and the reverse converter.

3. The ozone generating apparatus according to claim 2 wherein the reverse converter is of the atic type using one or more thyristors.

4. The ozone generating apparatus according to claim 2 wherein the forward converter is of the static type using one or more thyristors.

5. The ozone generating apparatus according to claim 2 wherein the reverse converter comprises one or more switching elements and further comprises a starting circuit for applying the engery for commutation of the switching elements of the reverse converter to the ozone generator at the time the ozone generating apparatus is started.

6. An ozone generating apparatus comprising
   a forward converter having first and second outputs for obtaining direct current from an alternating current power source,
   a DC reactor connected to the first output of the forward converter,
   a pair of switching elements each having first and second terminals, the first terminals of the switching elements being connected to the second output of the forward converter and the second terminals of the switching elements having a primary winding of a transformer connected therebetween,
   a middle tap of the primary winding of the transformer being connected to the DC reactor,
   an ozone generator having a discharge tube connected to the secondary winding of the transformer to receive a rectangular waveform current as the pair of switching elements are alternately turned on in a constant cycle period.

* * * * *

UNITED STATES PATENT AND TRADEMARK OFFICE
CERTIFICATE OF CORRECTION

PATENT NO. : 4,123,664

DATED : October 31, 1978

INVENTOR(S) : Takashi Yamamura et al

It is certified that error appears in the above-identified patent and that said Letters Patent are hereby corrected as shown below:

Column 8, line 2, delete "atic" and insert therefor --static--.

Signed and Sealed this

Seventeenth Day of July 1979

[SEAL]

Attest:

LUTRELLE F. PARKER

Attesting Officer     Acting Commissioner of Patents and Trademarks